United States Patent
Firth

[15] 3,680,404
[45] Aug. 1, 1972

[54] VARIABLE PITCH SHEAVE
[72] Inventor: David Firth, 1441 E. Jefferson Blvd., South Bend, Ind. 46617
[22] Filed: Nov. 2, 1970
[21] Appl. No.: 85,889

[52] U.S. Cl.......74/230.17 C, 287/52.06, 287/52.08, 287/53 R
[51] Int. Cl..........................F16h 55/22, F16d 1/06
[58] Field of Search............74/230.17 C, 230.17 R; 287/52.03, 52.04, 52.07, 52.08, 53

[56] References Cited
UNITED STATES PATENTS 3,122,028   2/1964   Hanke....................74/230.17 C
3,034,366   5/1962   Tann......................74/230.17 C
2,855,787   10/1958  Kumro et al..........74/230.17 C

*Primary Examiner*—Leonard H. Gerin
*Attorney*—Oltsch & Knoblock

[57] ABSTRACT

A variable pitch sheave in which cooperating belt-engaging disks have hubs which have screw threaded interfit. The inner hub and its disk has kerfs defining two hub clamping parts connected by a part of the disk. The outer hub has at least one set screw threaded therein and pressing against the inner hub to serve the dual functions preventing relative rotation of the disks to maintain a selected spaced setting of the disks and clamping the inner hub upon a shaft.

10 Claims, 8 Drawing Figures

PATENTED AUG 1 1972
3,680,404
SHEET 1 OF 2
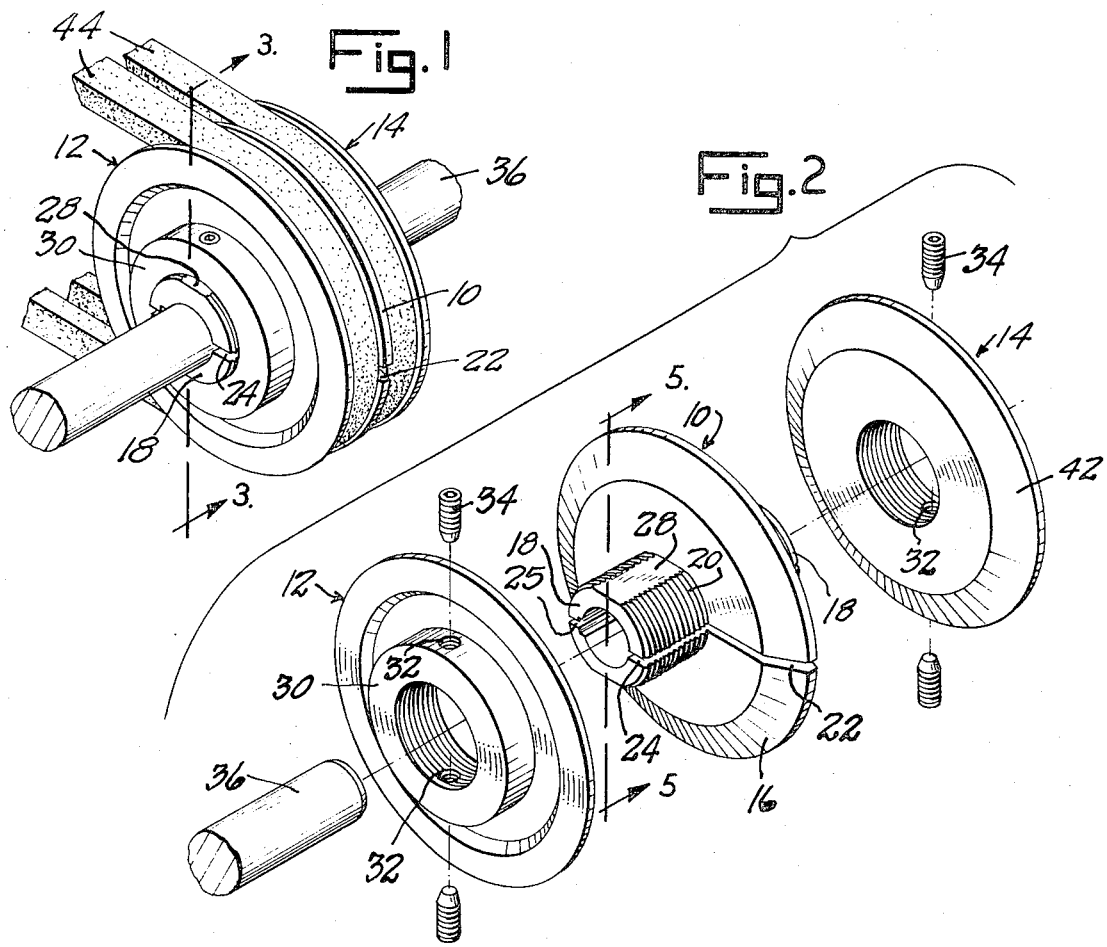
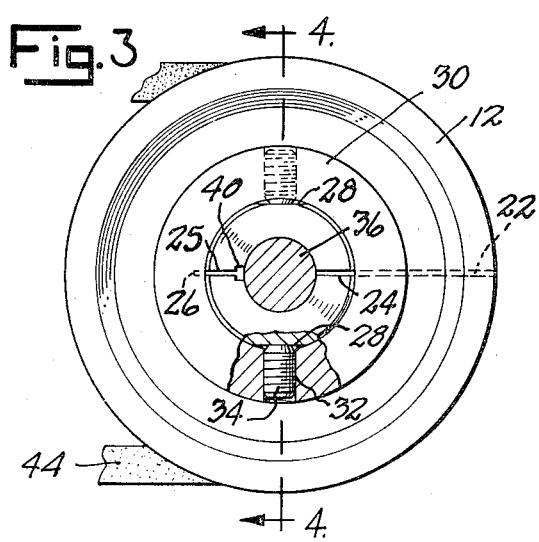
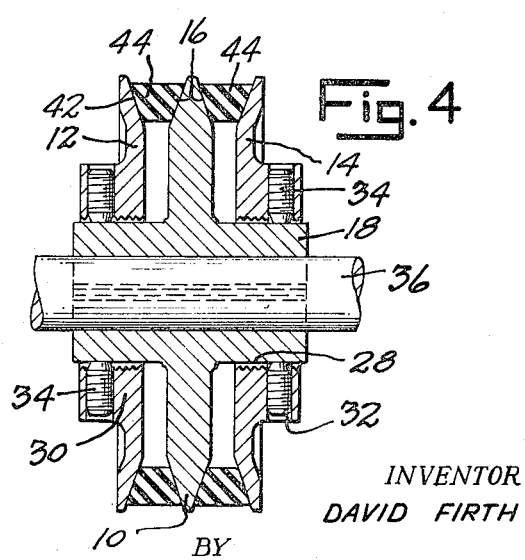
INVENTOR
DAVID FIRTH
BY
Ottoh of Knobloch
ATTORNEYS

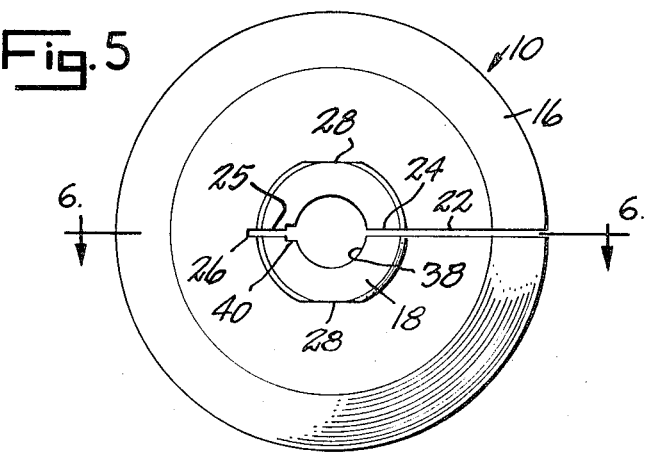
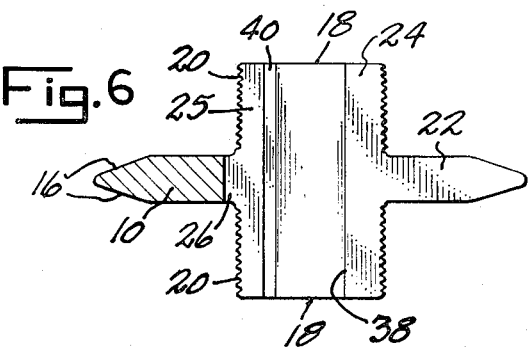
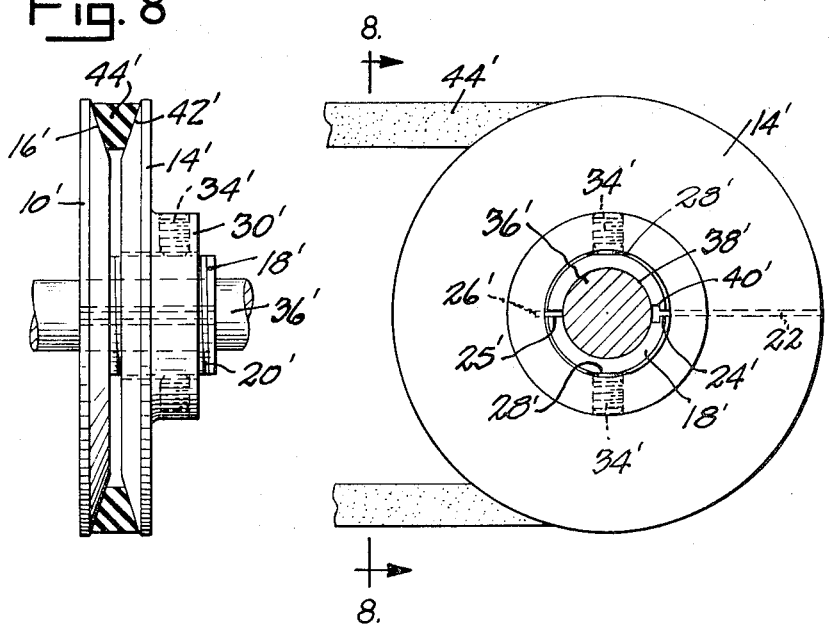
INVENTOR
DAVID FIRTH

VARIABLE PITCH SHEAVE

This invention relates to improvements in variable pitch sheaves, and more particularly to variable pitch sheaves for V-belts.

Variable pitch sheaves have been produced in different constructions which have been subject to various limitations and have entailed costly constructions with a large number of parts or other undesirable characteristics.

It is a primary object of this invention to provide a variable pitch sheave which is formed of a minimum number of parts which can be assembled readily, quickly and simply to produce a sheave of low cost.

A further object is to provide a variable pitch sheave having a partly split disk upon which a second disk is screw threaded in selected spaced relation, which sheave is retained in selected adjustment by locking means carried by the second disk and serving also to deform the split disk to clamp it upon a shaft.

Other objects will be apparent from the following specification.

In the drawings:

FIG. 1 is a perspective view of one embodiment of the variable pitch sheave.

FIG. 2 is an exploded view showing the parts of the sheave.

FIG. 3 is an end view of the sheave with parts shown in section.

FIG. 4 is an axial sectional view taken on line 4—4 of FIG. 3.

FIG. 5 is an end view of the central part of the sheave.

FIG. 6 is a sectional view taken on line 6—6 of FIG. 5.

FIG. 7 is an end view of another embodiment of the invention.

FIG. 8 is a sectional view taken on line 8—8 of FIG. 7.

My improved variable pitch sheave is formed of two disks each having a belt-contacting surface and a hub. The hubs have screw threaded interfit, with the threads of the inner hub being interrupted by at least one abutment surface, and the outer hub having at least one radial screw threaded bore to receive a set screw to press against an abutment surface of the inner hub. The inner hub is split at two points spaced from the abutment surface, and its disk is split on one radius only thereof. Tightening of the set screw when the disks are in selected laterally spaced relation while the inner hub is mounted on a shaft serves the dual purpose of preventing relative rotation of the hubs to maintain the selected spacing of the disks and of clamping the inner hub upon the shaft.

Referring to the drawings which illustrate the preferred embodiment of the invention, and particularly to the construction shown in FIGS. 1 to 6 inclusive, the sheave comprises a central disk part 10 and a pair of similar disk parts 12 and 14, complementary to part 10. The central disk part 10 is preferably of the construction best illustrated in FIGS. 2, 5 and 6. It consists of a disk 10 whose opposite faces at its margin are of frusto-conical configuration at 16. The frusto-conical surfaces 16 are similar and opposite and are equiangularly related to the central plane of the disk 10 and define a margin or peripheral portion of V-shape in cross section. Disk 10 has integrally and concentrically formed therewith, as by being cast therewith, a pair of similar opposed tubular hub portions 18. The unit 10-18 has a plain central bore 38 therethrough adapted for a snug sliding fit upon a shaft 36 on which the sheave is to be mounted.

The central part 10-18 is also characterized by a substantially radial narrow kerf or slot 22 extending therethrough from the outer edge of the disk 10 and into communication with a kerf portion 24 extending through and open at the inner diameter or bore of both hub portions 18. Thus the kerfs 22 and 24 provide an open-ended substantially radial and continuous narrow opening between the bore 38 and the outer periphery of disk 10. The edges of the kerf 22, particularly at portions 16, are machined or treated to remove burrs and to avoid damage to portions of belts 44 contacted thereby. A kerf 25 extends through the hub portions 18 opposite kerf 24 and preferably substantially parallel to and aligned with the kerfs 22 and 24. Kerf 25 preferably terminates in a kerf 26 formed in the disk 10 for a short distance and terminating spaced from the hubs 18, as best seen in FIG. 3.

Each of the hubs 18 is provided with one or a pair of abutment surfaces 28. Preferably the surfaces 28 are substantially flat and one surface 28 is located at each of the opposite shaft-clamping hub portions and equispaced from and substantially parallel to the kerfs 22-24-25-26. Both hubs 18 are externally screw threaded at 20. The threads of the hubs 18 preferably are of the same lead and pitch and are interrupted at the kerfs 24-25 and at the abutment surfaces 28. The bore 38 is also preferably interrupted by a longitudinal slot 40 or key way which may be symmetrically disposed relative to the kerf 25, as illustrated.

Each of the parts 12-14 comprises a disk having an integral concentric tubular hub 30 projecting from one face thereof. Each hub 30 has an internally screw threaded bore whose threads mesh or mate with the threads of one of the hubs 18 of the part 10. The face of each disk 12,14 opposite that from which hub 30 projects has a marginal frusto-conical or tapered surface 42 which is complementary to the confronting frusto-conical surface 16 of the central disk 10. The parts are assembled as illustrated in FIG. 1, with the hubs 30 outermost and the disks of parts 12 and 14 adjacent to the disk of part 10. In this fashion, the faces 16 and 42 cooperate to provide sides of V-grooves in which V-belts 44 are trained.

The spacing of the parts 12 and 14 from part 10 is adjustable in small increments by rotation of the parts 12 and 14 upon the hubs 18 of the part 10. This produces variation of width of the sheave in a manner to determine the inner and outer radii of the effective areas of engagement of the belts 44 with the surfaces 16 and 42, and thereby controls the speed ratio of the driving and driven shafts of the belt drive assembly of which the sheave is a part.

The hub 30 of each of the parts 12-14 is provided with a screw threaded radial bore 32, and preferably with a pair of diametrically opposed axially aligned radial screw threaded bores 32, extending therethrough and each adapted to receive a set screw 34. Each set screw engages an abutment durface 28 of the associated hub 18 in each operative adjustment thereof. When the parts 10, 12, 14 of the sheave are adjusted in desired relation or spacing with the set screws 34 confronting an abutment surface 28, the screws are threaded in their receiving bores to advance them with their ends abutting and pressing against said faces 28. The engagement of the set screws 34 with the faces 28 anchors the respective parts 12 and 14 relative to the central part 10 by preventing relative rotation of the parts so as to maintain the selected setting or adjustment of the parts for the selected spacing of each belt-engaging frusto-conical surface 42 relative to the opposed frusto-conical belt-engaging surface 16 of part 10.

In the construction illustrated an additional function is served by the advance and tightening of the set screws 34: namely, a flexing of the member 10 by the application of inwardly directed pressure against the surfaces 28 of the hubs, which causes the opposed halves of the hubs to effect a clamping action upon the shaft 36. This clamping action may be sufficient alone to effectively anchor the sheave upon the mounting shaft 36, or it may supplement the function of a key (not shown) mounted in groove 40 and in a complementary groove (not shown) of the shaft 36.

It will be apparent that the sheave provides a wide range of adjustment of driving contact with two belts by means of a simple construction using only three sheave parts in association with four set screws. Adjustment of the sheave is readily accomplished by relative rotation of its parts, and is effectively maintained by set screws once it is selected. The parts are readily accessible and manipulated for such adjustment, and the provision of the abutment surfaces 28 upon the hubs 18 makes the determination of each operative setting or adjustment a matter of simple observation. It will be noted also that the increments of adjustment equal one-half the number of threads per inch. Thus, in cases where the screw threads are of the type having 16 threads per inch, the increments of adjustment of spacing of the disks will be one thirty-second of an inch.

The function of anchorage of the sheave upon the shaft 36 occurs coincidentally and simultaneously with the tightening of the set screws 34 and thus expedites and speeds the mounting and adjustment of the sheave. Likewise, it will be observed that, in the construction shown in FIG. 1, the action of clamping the sheave upon the mounting shaft 36 is effected at two longitudinally spaced points on the shaft, that is, by the two sets of screws 34 each carried by a hub 30 of one of the parts 12 and 14.

The construction is also adapted for single sheaves, that is, for a sheave mounting a single V-belt. Such a construction is shown in FIGS. 7 and 8 wherein disk 10' has a hub 18' formed integrally therewith and projecting from one face thereof. DIsk 10' has formed at the margin of the face thereof from which hub 18' projects a frusto-conical belt-engaging face 16'. The hub 18' is formed similarly to the hubs 18, being provided with one or a pair of opposed abutment surfaces 28' interrupting external screw threads 20'. Bore 38' extends centrally through the hub 18' and is smooth to provide a snug fit upon a shaft 36'. Disk 10' is provided with a narrow kerf or slot 22' extending therethrough from the outer periphery thereof and kerf 24' extends through the adjacent hub portion 18'. Kerfs 22' and 24' preferably extend in a direction substantially parallel and centered between the abutment surfaces 28'. Kerf 25' splits the hub 18' substantially diametrically opposite and aligned with kerf 24', and a shallow kerf 26' is preferably formed in the disk 10' to extend for a short distance from the hub 18'.

A complementary sheave part, such as a part 14' has a tubular hub 30' which is screw threaded on the hub 18' of the disk 10' and has a frusto-conical marginal surface 42' confronting and cooperating with the beveled surface 16' of disk 10' to define a V-groove which receives a V-belt 44'. Diametrically opposed set screw bores are preferably provided in hub 30' to receive set screws 34' engageable with the abutment surfaces 28' to anchor the sheave parts against relative rotation in selected adjustment and to effect a clamping action of the split hub 18' upon the shaft 36', which mounts the sheave.

A longitudinal internal groove or key way 40' may be formed in the inner hub 18' and is here shown as symmetrically arranged relative to the kerf 24', althouth this position is optional.

The device shown in FIGS. 7 and 8 has the same advantages and is adjusted and manipulated in the same manner described above relative to the device shown in FIGS. 1 to 6 inclusive.

While the preferred embodiments of the invention have been illustrated and described, it will be understood that changes in the construction may be made within the scope of the appended claims without departing from the spirit of the invention.

What I claim is:

1. A variable pitch sheave comprising a pair of disks having complementary frusto-conical confronting marginal belt-engaging surfaces, an inner externally screw threaded concentric tubular hub projecting from one disk, said one disk and its hub having a concentric bore therethrough for receiving a shaft, an outer concentric hub projecting from the second disk and internally screw threaded to mate with the threads of said inner hub, said inner hub and its disk having an open ended kerf extending therethrough from the outer diameter of said disk to the inner diameter of said hub, said inner hub having a second kerf extending therethrough opposite said first kerf, said kerfs defining two opposed clamping hub parts, said outer hub having a radial screw threaded bore, and set screw means in said bore bearing against said inner hub for causing said hub parts to make clamping contact with a shaft when extending through said shaft-receiving bore.

2. A variable pitch sheave as defined in claim 1, wherein said outer hub has a pair of substantially axially aligned bores each containing a set screw means, said screws means being engageable with opposite clamping parts of said inner hub to urge them toward each other.

3. A variable pitch sheave as defined in claim 2, wherein each clamping hub part of said inner hub has a set screw means abutment surface interrupting the screw threads thereof and substantially equally spaced from said kerfs.

4. A variable pitch sheave as defined in claim 2, wherein the kerfs of said inner hub are substantially aligned and each clamping part of said inner hub has a set screw means abutment surface interrupting the threads thereof and substantially parallel to the kerfs thereof.

5. A variable pitch sheave as defined in claim 1, wherein said second kerf terminates in said disk adjacent said hub.

6. A variable pitch sheave as defined in claim 1, wherein said inner hub projects from both faces of said one disk and a third disk has an outer concentric tubular internally screw threaded hub carried by the end of said inner hub opposite that carrying the hub of the second disk.

7. A variable pitch sheave as defined in claim 1, wherein one disk has similar frusto-conical marginal surfaces at opposite sides thereof and inner concentric externally screw threaded hubs projecting from both faces thereof, and a third disk having a frusto-conical marginal surface complementary to a frusto-conical surface of said first disk and an outer internally screw threaded hub mounted on the inner threaded hub of said first disk opposite that which mounts the hub of the second disk.

8. A variable pitch sheave as defined in claim 7, wherein both of said inner hubs have set screw means abutment surfaces at both of the opposed clamping parts thereof.

9. A variable pitch sheave comprising a pair of parts each having a tubular hub and a disk, said disks having frusto-conical confronting belt-engaging surfaces, one hub having internal threads receiving and mating with external threads of the other hub, said part which includes said externally threaded hub having an open ended kerf extending from outer to inner diameter thereof, and means carried by said internally threaded hub and bearing on said externally threaded hub to prevent relative rotation of said parts and press said externally threaded hub against a shaft.

10. A variable pitch sheave as defined in claim 9, wherein the externally threaded hub has a second kerf extending therethrough and cooperating with said first kerf to define a pair of shaft clamping members.

* * * * *